(12) United States Patent
Janour et al.

(10) Patent No.: US 11,895,258 B2
(45) Date of Patent: Feb. 6, 2024

(54) TELECONFERENCING DEVICE WITH READILY ADAPTIVE SUPPORT

(71) Applicant: Hewlett-Packard Development Company, L.P., Spring, TX (US)

(72) Inventors: George Janour, Santa Cruz, CA (US); Robert Barrie Turnbull, Port Moody (CA); Bowman Wang, Corralitos, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 279 days.

(21) Appl. No.: 17/206,739

(22) Filed: Mar. 19, 2021

(65) Prior Publication Data

US 2022/0303378 A1 Sep. 22, 2022

(51) Int. Cl.
| H04M 1/62 | (2006.01) |
| F16M 13/02 | (2006.01) |
| F16M 13/00 | (2006.01) |
| H04M 3/56 | (2006.01) |

(52) U.S. Cl.
CPC ............ *H04M 1/62* (2013.01); *F16M 13/005* (2013.01); *F16M 13/02* (2013.01); *H04M 3/56* (2013.01)

(58) Field of Classification Search
CPC .......... H04M 1/62; H04M 3/56; H04M 1/605; F16M 13/005; F16M 13/02; F16M 11/10; F16M 11/16
See application file for complete search history.

(56) References Cited

U.S. PATENT DOCUMENTS

| 8,730,175 | B2 | 5/2014 | Badali et al. |
| 8,964,970 | B1* | 2/2015 | Schnabl .............. H04M 1/0295 |
| | | | 379/428.03 |
| 9,762,709 | B1* | 9/2017 | Snyder .................... H04M 1/23 |
| 10,876,677 | B2* | 12/2020 | Green .................. F16M 11/046 |
| 10,986,164 | B2* | 4/2021 | Binder .................... H04L 65/60 |
| 2005/0100146 | A1* | 5/2005 | Pelletier ............... H04M 11/066 |
| | | | 379/93.05 |
| 2005/0164736 | A1* | 7/2005 | Brull ....................... H04M 1/05 |
| | | | 455/557 |
| 2005/0254634 | A1* | 11/2005 | Sun ..................... H04L 12/2854 |
| | | | 379/93.24 |
| 2006/0061555 | A1* | 3/2006 | Mullen ................. G06F 1/1624 |
| | | | 345/169 |
| 2008/0104524 | A1* | 5/2008 | Van Hammond ... H04M 1/2535 |
| | | | 715/762 |
| 2008/0279343 | A1* | 11/2008 | Bentley .................... H04M 1/21 |
| | | | 379/33 |
| 2017/0324850 | A1* | 11/2017 | Snyder .................... H04M 1/23 |
| 2019/0364357 | A1* | 11/2019 | Haastrup ................. H04M 1/62 |

FOREIGN PATENT DOCUMENTS

WO WO-2007022776 A1 * 3/2007 .............. H04M 1/02

* cited by examiner

*Primary Examiner* — Akelaw Teshale
(74) *Attorney, Agent, or Firm* — Quarles & Brady LLP

(57) ABSTRACT

A teleconferencing device with an easily removable support stand allows users to easily change the angle of the device on a desk. Wall-mounts hidden within the removable stand allow the device to be mounted easily to a wall.

20 Claims, 9 Drawing Sheets

TELECONFERENCING DEVICE WITH READILY ADAPTIVE SUPPORT

TECHNICAL FIELD

This disclosure relates generally to teleconferencing devices and relates particularly to a system for presenting a teleconferencing device to a user in multiple orientations.

BACKGROUND

During the useful life of teleconferencing devices such as speakerphones, a user may initially wish to place the device on a desk (or similar surface) and later prefer to mount the device to a wall, or vice-versa. Further, a user may wish to change the angle that the front of the speakerphone or other teleconferencing device makes when placed on a flat surface. To provide users the option of changing the placement and/or orientation of these devices, they commonly require costly and inconvenient mechanisms such as brackets and adapters. Thus, there is room for improvement in the art.

SUMMARY

An example of this disclosure is a teleconferencing device, comprising: a front side, the front side comprising one or more planar regions, at least one of the one or more planar regions residing within a first plane; a back pane connected to the front side and comprising a lower portion; and a rear stand detachably connected to the back pane, the rear stand having a hollow portion forming a housing around one or more wall-mount platforms, wherein each of the one or more wall-mount platforms has a flat wall-contact portion, each flat wall-contact portion residing within a second plane.

Another example of this disclosure is a teleconferencing device, comprising: a front face, the front face comprising one or more planar areas, the one or more planar areas residing within a first plane; and a back pane connected to the front face and having a lower portion, the back pane comprising one or more wall-mount platforms, wherein the back pane is configured to receive a detachable stand, the detachable stand having a hollow portion capable of forming a housing around the one or more wall-mount platforms when received.

Another example of this disclosure is a method of presenting a teleconferencing device, comprising: providing a teleconferencing device, the teleconferencing device including: a front side having one or more flat regions forming a first plane; and a back pane having a lower portion; and detachably connecting a rear stand to the back pane, whereby a hollow portion of the rear stand forms a housing around one or more wall-mount platforms of the back pane, wherein each of the one or more wall-mount platforms has a flat wall-contact portion residing within a second plane, the second plane forming an angle of between ten and twenty degrees with the first plane.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings.

5D further illustrates the underside of the rear stand, in accordance with an example of this disclosure.

Figure 6A:
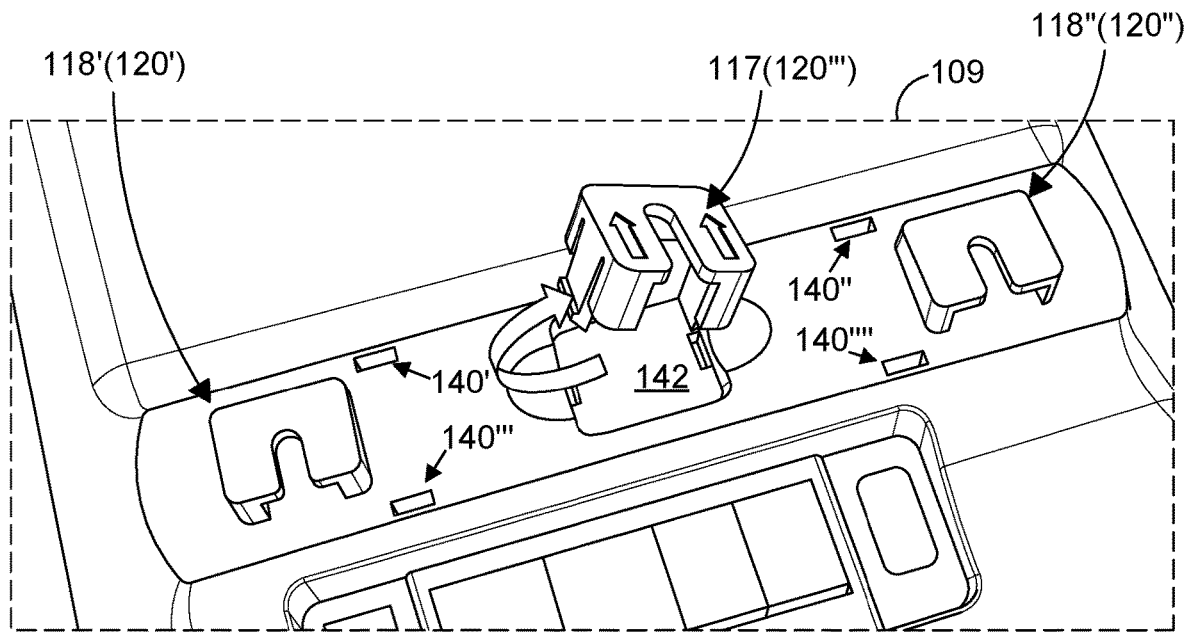

FIG. 6A illustrates a magnified view of a portion of the back pane of a teleconferencing device with a removable wall-mount platform being removed from a receiving area, in accordance with an example of this disclosure.

Figure 6B:
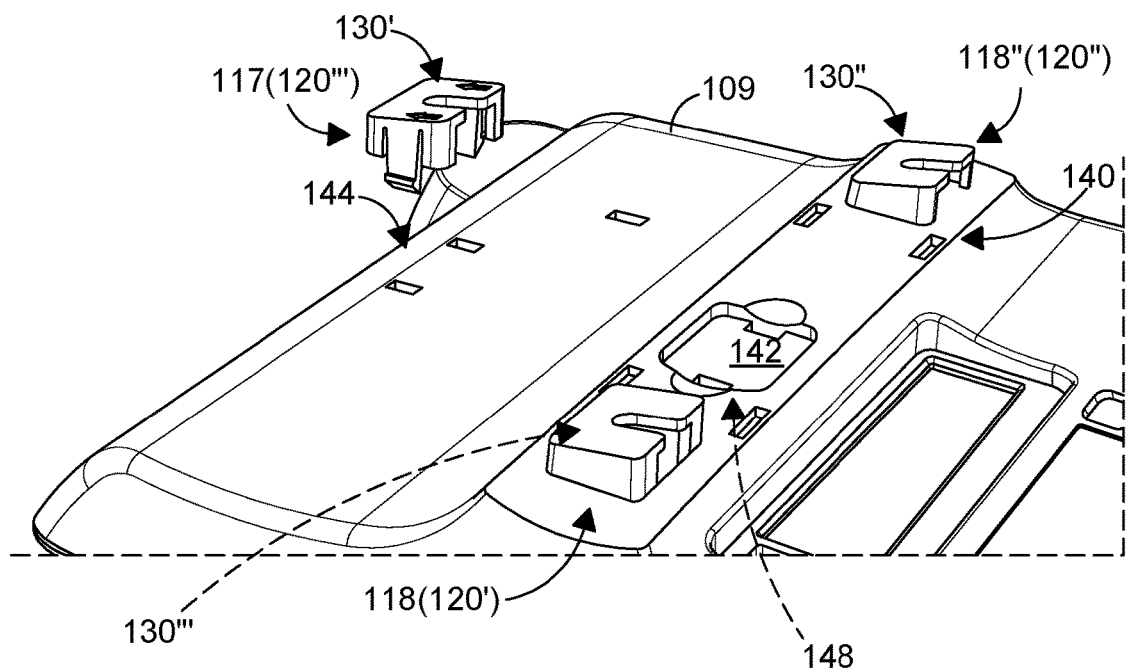

FIG. 6B illustrates another magnified view of a portion of the back pane of a teleconferencing device with a removable wall-mount platform being readied for placement at a different receiving area from that of FIG. 6A, in accordance with an example of this disclosure.

Figure 6C:
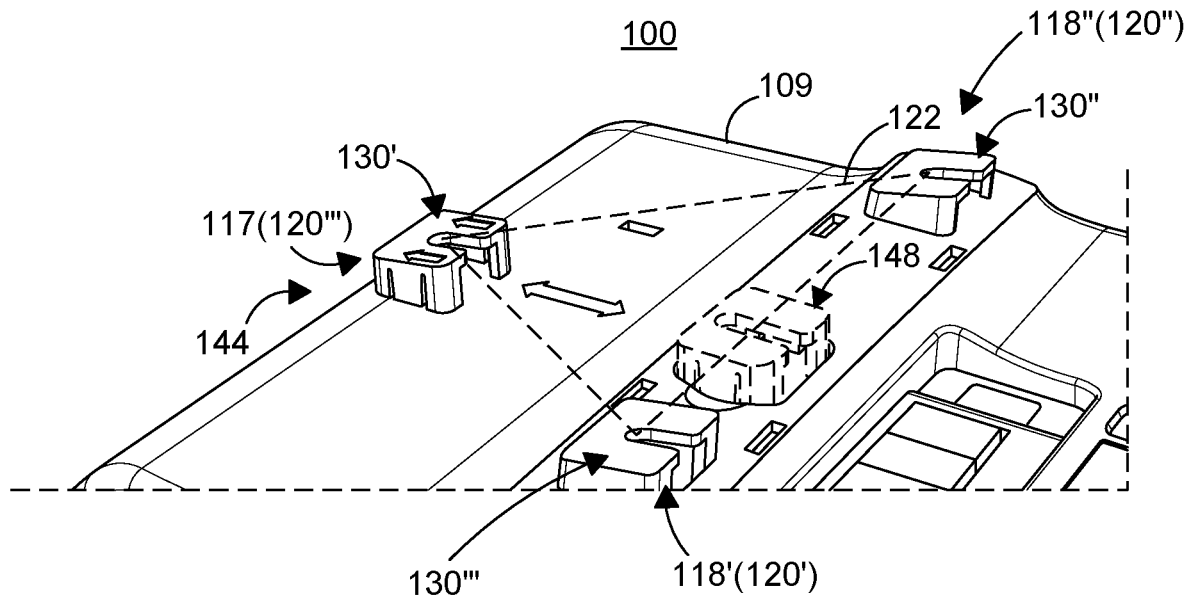

FIG. 6C illustrates a plane formed by wall-contact portions of wall-mount platforms of a teleconferencing device, in accordance with an example of this disclosure.

Figure 6D:
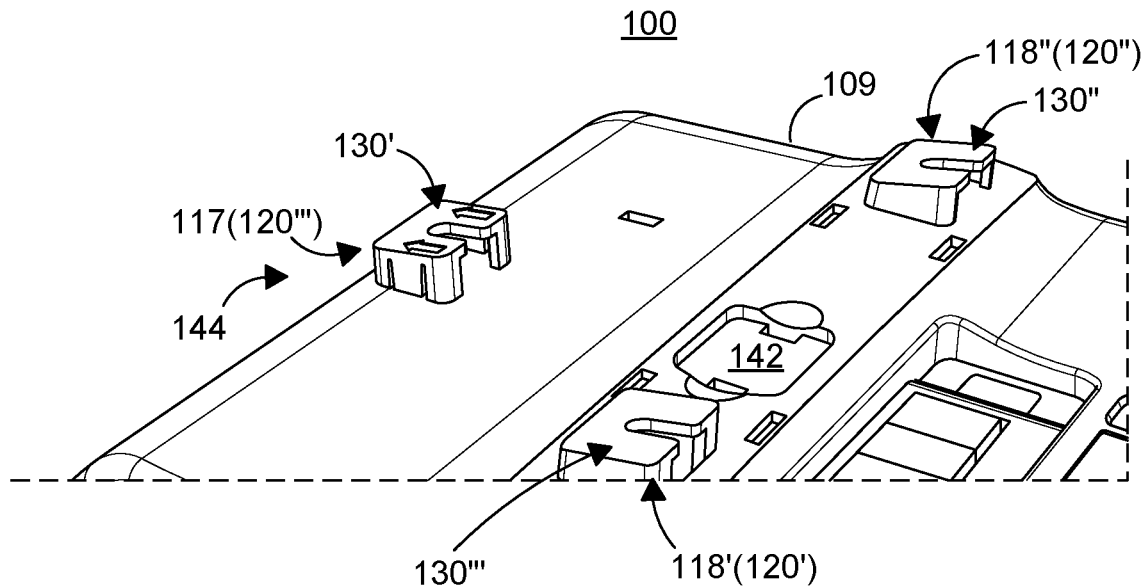

FIG. 6D illustrates another magnified view of a portion of the back pane of a teleconferencing device with a removable wall-mount platform releasably attached at a second location after having been removed from a first location as in FIG. 6A, in accordance with an example of this disclosure.

Figure 7:
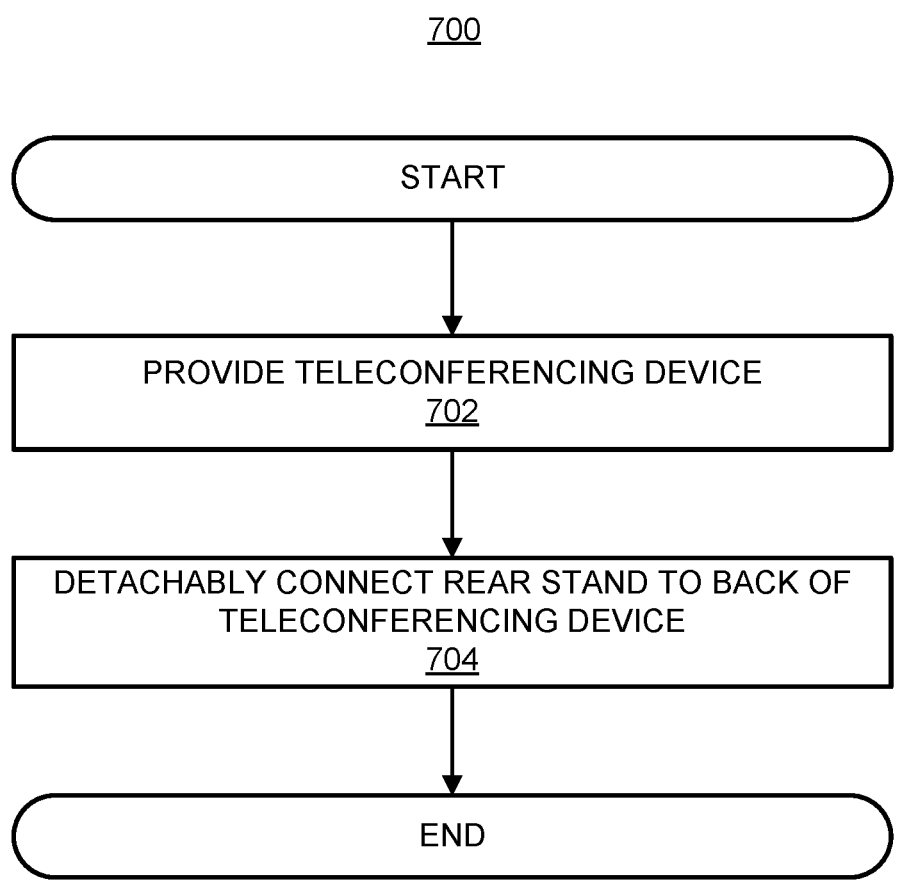

FIG. 7 illustrates a method of presenting a teleconferencing device to a user, in accordance with an example of this disclosure.

DETAILED DESCRIPTION

In the drawings and the description of the drawings herein, certain terminology is used for convenience only and is not to be taken as limiting the examples of the present disclosure. In the drawings and the description below, like numerals indicate like elements throughout.

Figure 1:
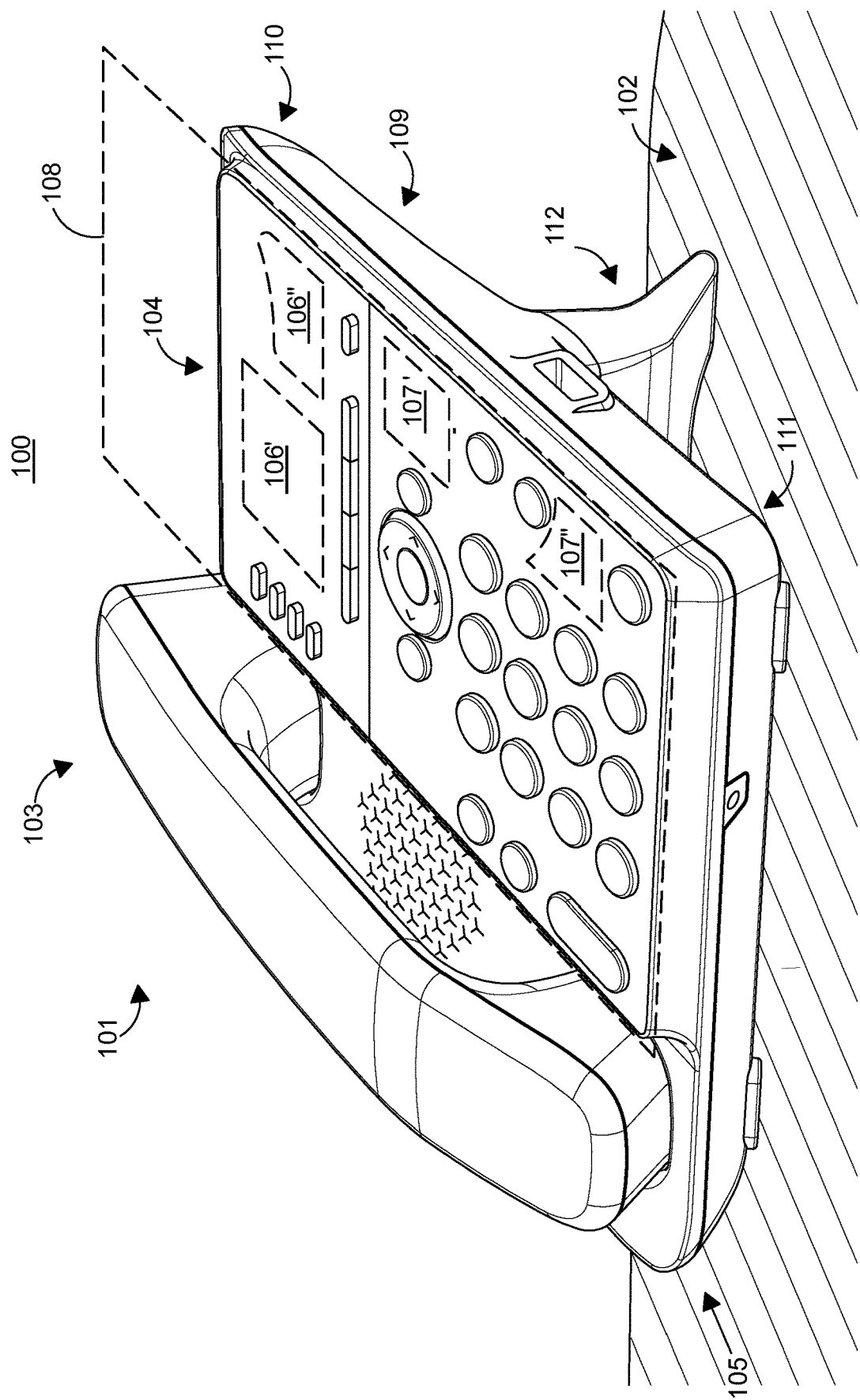
FIG. 1 illustrates a teleconferencing device, in accordance with an example of this disclosure.

FIG. 1 illustrates a teleconferencing device 100, in accordance with an example of this disclosure. The teleconferencing device 100 is in a first configuration 101 for placement on a flat surface 102, such as a desk. The teleconferencing device 100 has a front side 103. The front side 103 contains one or more flat or substantially flat planar regions 106, 107. At least some of the planar regions 106, 107 reside within a first plane (e.g., 108). In some examples, most or all the planar regions (areas) 106, 107 reside within a single plane (e.g., 108). The front side 103 has an upper portion 104 and a lower portion 105. At the back (pane) 109 of the teleconferencing device 100 is a rear stand 112 which supports the teleconferencing device 100 in a semi-upright position in which the front side 103 is at angle with the surface 102. Like the front side 103, the back pane 109 has an upper portion 110 (which is connected to the upper portion 104 of the front side 103) and a lower portion 111 (which is connected to the lower portion 105 of the front side 103). As will be explained in greater detail, in some examples the rear stand 112 is reversible and/or removable to enable the teleconferencing device 100 to rest at different angles and/or to enable the teleconferencing device 100 to be attached to a flat vertical surface, such as a wall.

Figure 2:
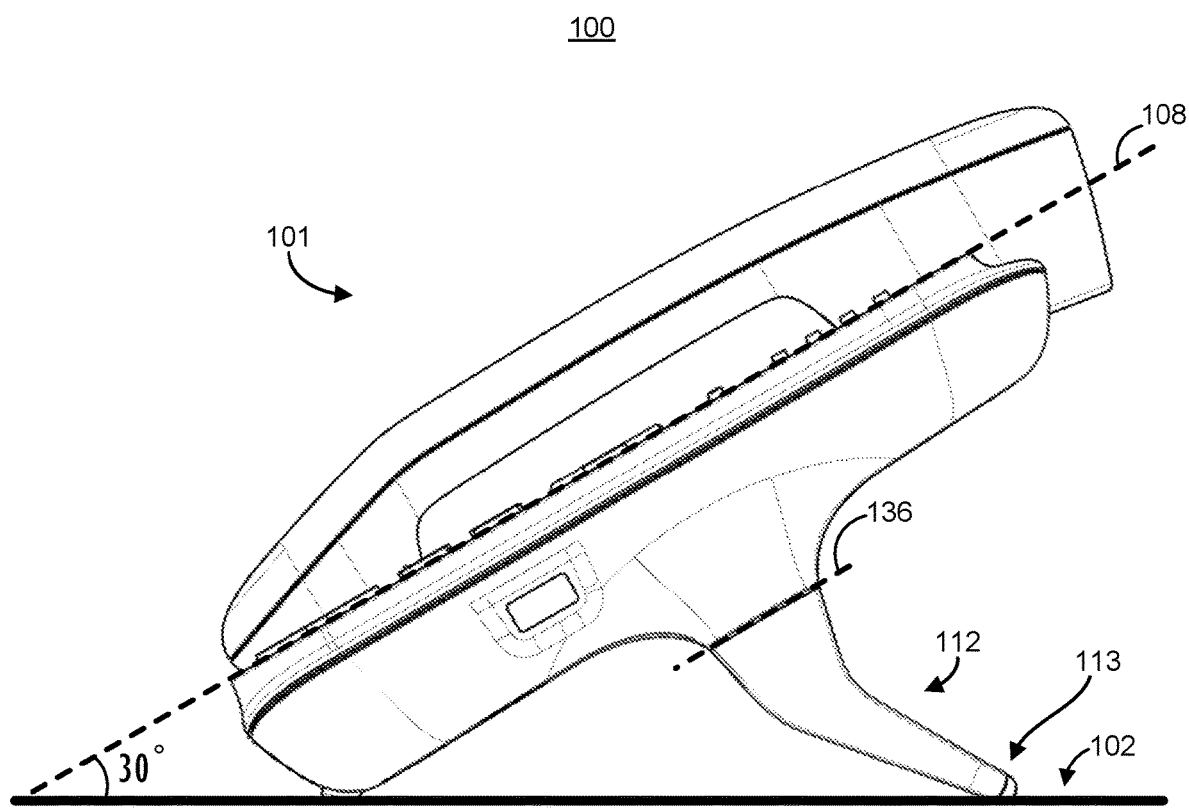
FIG. 2 is a side view of the teleconferencing device resting on a surface as in FIG. 1, in accordance with an example of this disclosure.

FIG. 2 is a side view of the teleconferencing device 100 resting on a surface 102, as in FIG. 1. In this configuration 101 of the teleconferencing device 100, the plane 108 of the front side 103 is at a 30-degree angle with the surface 102. As will be explained in greater detail, in some examples of this disclosure, the area where the rear stand 112 is attached to the teleconferencing device 100 forms a plane 136 which is parallel to plane 108. When the teleconferencing device 100 is placed on a substantially flat horizontal surface (e.g., a table), at least some portion of the base 113 of the rear stand 112 will contact that surface 102.

Figure 3:
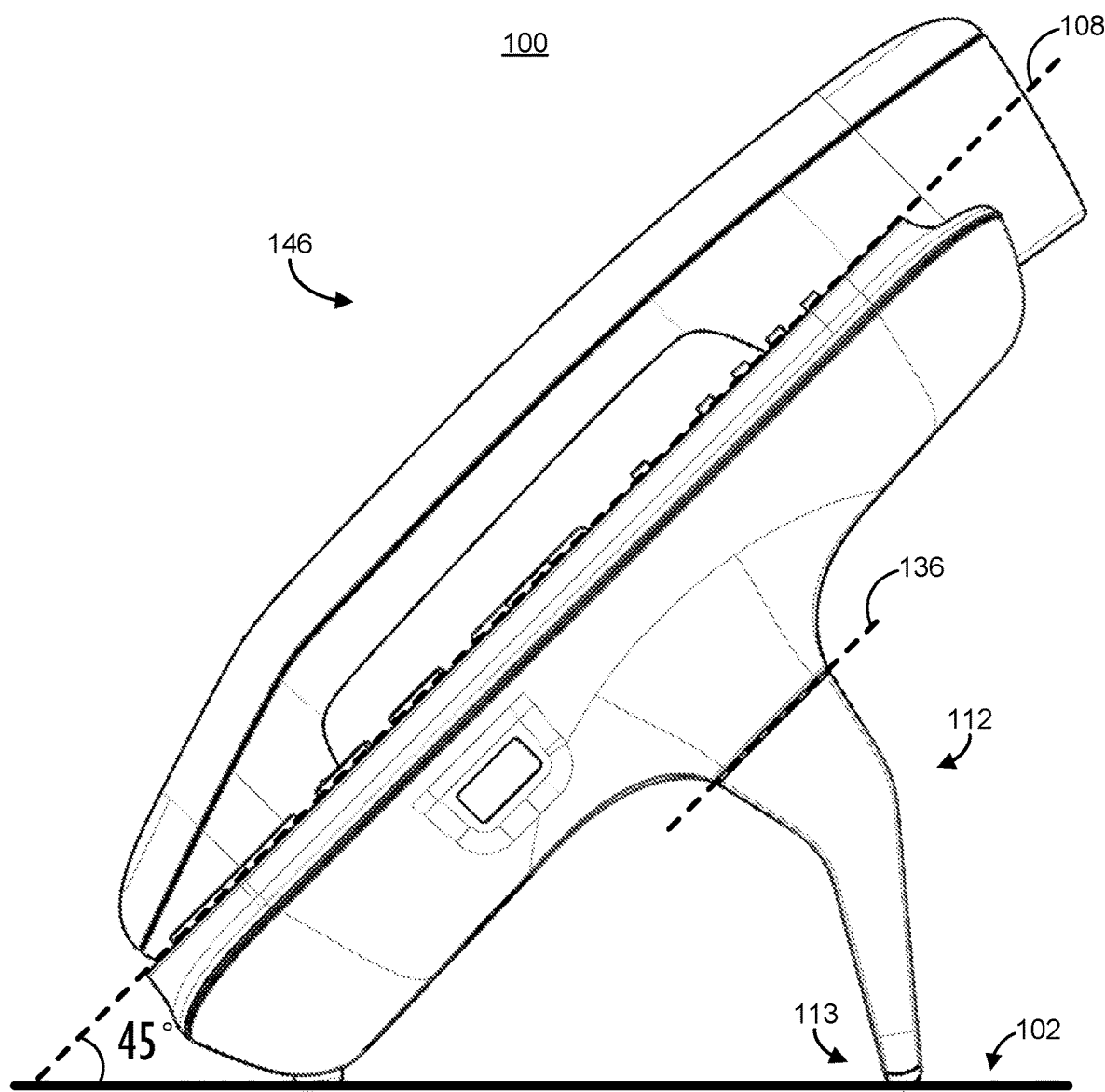
FIG. 3 is another side view of the teleconferencing device resting on a surface, but at a different angle than in FIG. 2, in accordance with an example of this disclosure.

FIG. 3 is another side view of the teleconferencing device 100 resting on a surface 102. However, the rear stand 112 has been reoriented. In this configuration 146 of the teleconferencing device 100, the plane 108 of the front side (103) is at a 45-degree angle with the surface 102. As will be explained in greater detail (see FIG. 5C), the rear stand 112 is hollow or contains a cavity. An opening in the rear stand 112 (not visible in FIG. 3) has a perimeter that forms a plane 136 which, in at least some examples, is parallel to the plane 108 of the front side (103). As noted in the discussion of FIG. 2, when the teleconferencing device 100 rests on a surface 102, at least some portion of the base 113 of the rear stand 112 rests against that surface 102.

Figure 4:
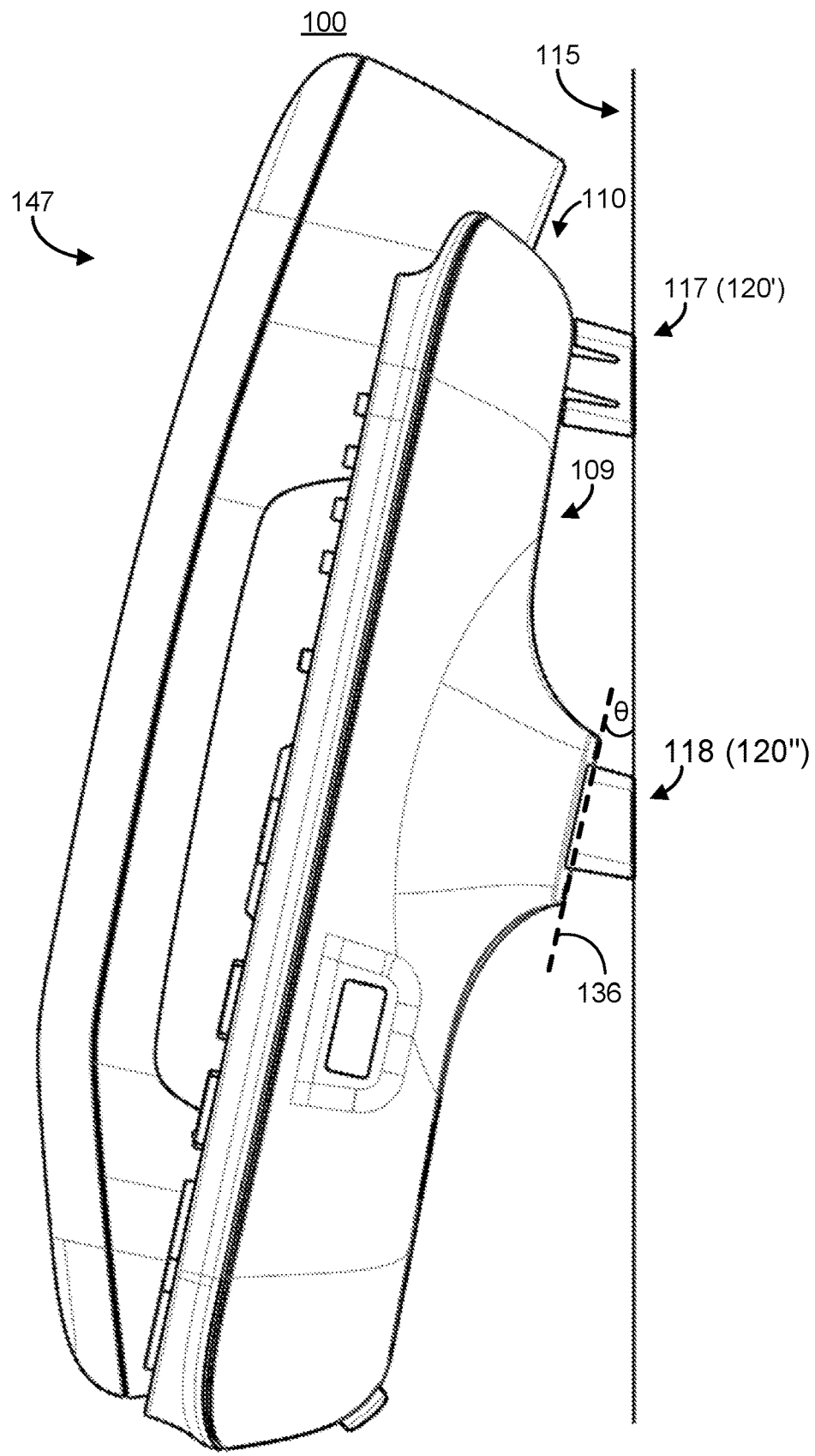
FIG. 4 illustrates the teleconferencing device mounted on a wall using previously concealed mounting platforms, in accordance with an example of this disclosure.

FIG. 4 illustrates the teleconferencing device 100 in a configuration 147 in which the rear stand 112 has been removed and the teleconferencing device 100 is mounted on a wall 115 using mounting platforms 120. The mounting platform 117 (120) which is higher on the wall 115 was moved from a position hidden by the rear stand 112 when the rear stand 112 was removed from the back pane 109. The mounting platform 117 (120) which is higher on the wall 115 is removably attached to the upper portion 110 of the back pane 109. The mounting platform 118 (120) which is lower on the wall 115 was also hidden within the rear stand 112 before the rear stand 112 was removed. In some examples of this disclosure, the mounting platform 118 (120) which is lower on the wall 115 is not removable from the back pane 109. In some examples of this disclosure, the mounting platform 118 (120) which is lower on the wall 115 is removable from the back pane 109. The area from which the rear stand 112 has been detached forms plane 136 (see FIG. 2 and FIG. 3). Plane 136 forms angle θ (theta) with the wall. In at least some examples of this disclosure, angle θ is between ten and twenty degrees.

Figure 5A:
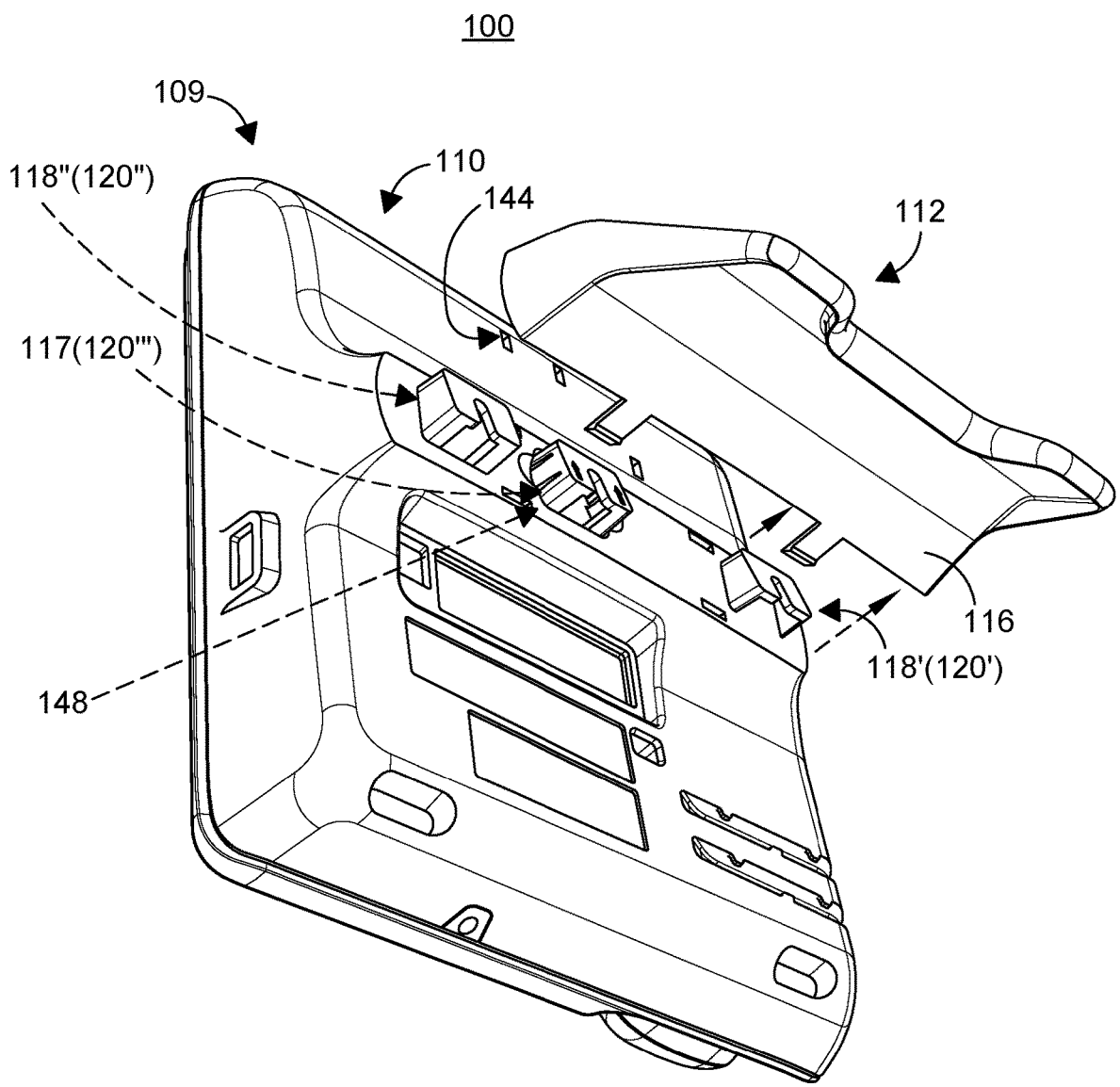
FIG. 5A illustrates the back pane of the teleconferencing device with the rear stand being transitioned from one orientation to another, in accordance with an example of this disclosure.

FIG. 5A illustrates the back pane 109 of the teleconferencing device 100. Also shown is the rear stand 112 being removed from the back pane 109. The rear stand 112 has an inwardly curved concave side 116 which is opposite a convex side (not visible in FIG. 5A). Removal of the rear stand 112 exposes three wall-mounts 120. The wall-mount 117 (120) in the middle of the other (outer) two wall-mounts 118 (120) corresponds to wall-mount 117 (120) from FIG. 4 and is removably attached to the back pane 109. That is, FIG. 5A shows wall-mount 117 (120) removably attached at a first location 148 on the back pane 109 before being moved to a second location 144, as in FIG. 4. In at least some examples of this disclosure, relocating the removable wall-mount 117 (120) to the upper portion 110 of the back pane 109 (as shown in FIG. 4) enables the teleconferencing device 100 to be attached to a wall 115 or other vertical flat surface.

Figure 5B:
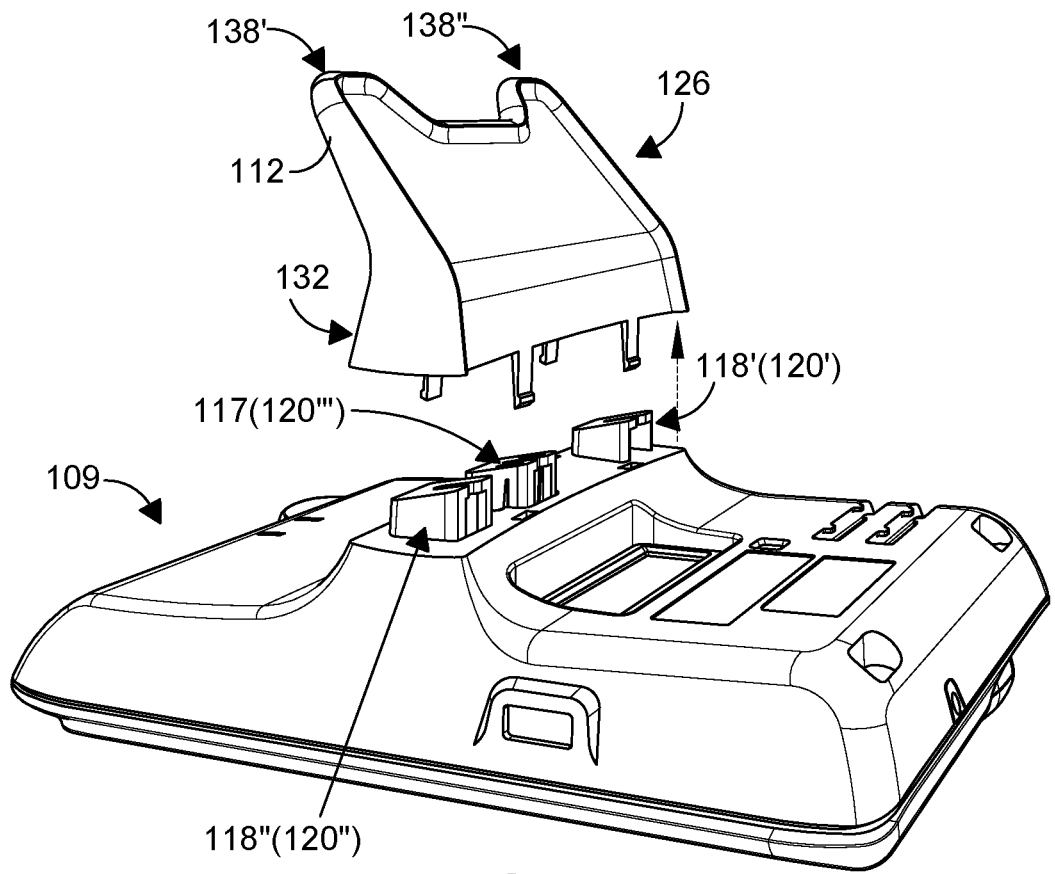
FIG. 5B illustrates another view of the back pane of the teleconferencing device with the rear stand being transitioned from one orientation to another, in accordance with an example of this disclosure.

FIG. 5B illustrates the back pane 109 of the teleconferencing device 100. Also shown is the rear stand 112 after being removed from the back pane 109 and rotated 180 degrees (compare FIG. 2 with FIG. 3). In this view, the convex side 126 of the removable rear stand 112 is visible. As in FIG. 5A, removal of the rear stand 112 exposes three wall-mounts 120. The wall-mount 117 (120) that is between the other two wall-mounts 118 (120) can be removed and relocated (see FIGS. 6A-6C). The rear stand 112 has a hollow portion 132 which houses the wall-mounts 117, 118 (120) when the rear stand 112 is (detachably) connected to the back pane 109. The rear stand 112 has rectilinear portions 138 which rest against whatever (substantially) horizontal flat surface upon which the teleconferencing device 100 is placed, (when the rear stand 112 is attached to the back pane 109, see FIGS. 1-3).

Figure 5C:
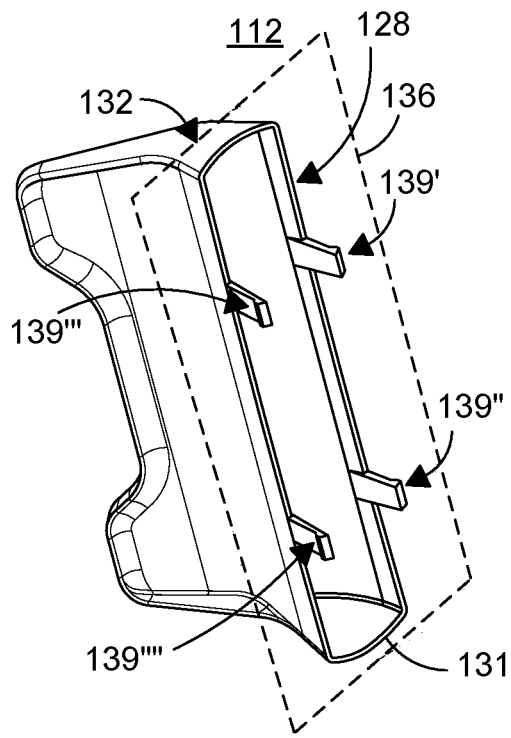
FIG. 5C illustrates the underside of the rear stand, in accordance with an example of this disclosure.

FIG. 5C illustrates the rear stand 112 rotated from its orientation in FIG. 5B. In FIG. 5C, an opening 128 in the hollow portion 132 of the rear stand 112 is visible. Extending from the rear stand 112 are four prongs 139 which are used to releasably connect the rear stand 112 to the back pane 109. The lip 131 of the opening 128 (except for the prongs 139) lies within a flat plane 136 (see FIGS. 2-4).

Figure 5D:
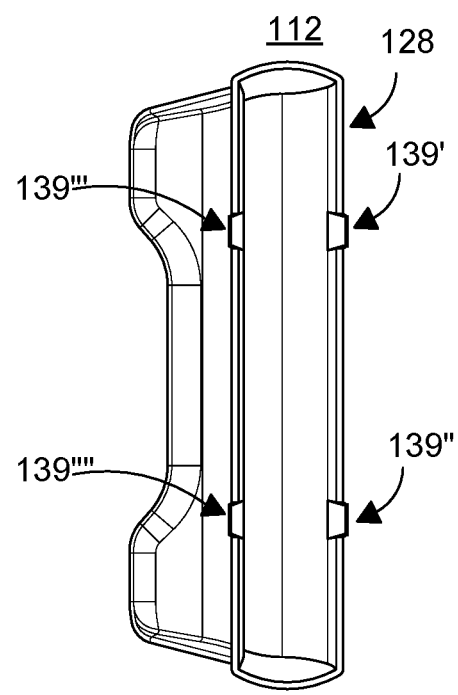

FIG. 5D illustrates the rear stand 112 rotated from its position in FIG. 5B and FIG. 5C. In FIG. 5D the opening 128 in the rear stand 112 is again visible. In various examples, the rear stand 112 forms a housing for one or more wall-mounts (120) when the rear stand 112 is attached to the back pane 109 as shown in FIGS. 1-3.

FIG. 6A illustrates a magnified view of a portion of the back pane 109 of the teleconferencing device 100 after the rear stand 112 (not shown) has been removed. Removable wall-mount 117 (120) is shown being removed from a wall-mount receiving area 142 of the back pane 109, the wall-mount 117 (120) having previously been housed within the rear stand 112. Also shown are four apertures 140 into which the prongs 139 (see FIG. 5C and FIG. 5D) of the rear stand 112 can be inserted to removably attach the rear stand 112 to the back pane 109.

FIG. 6B illustrates another magnified view of a portion of the back pane 109 of the teleconferencing device 100 after the wall-mount 117 (120) has been removed from its location in FIG. 5B (wall-mount platform receiving area 142) for placement at a new location 144. Removable wall-mount 117 (120) and the other wall-mounts 118 (120) each have a flat wall contact portion 130 which contacts a wall when the teleconferencing device is attached to the wall 115 (see FIG. 4).

FIG. 6C illustrates another magnified view of a portion of the back pane 109 of the teleconferencing device 100 after the rear stand 112 has been removed. Removable wall-mount 117 (120) can be connected to the back pane 109 in either of two positions (144, 148), as shown. Except for the grooves in the wall-mounts 120, the wall-mounts 120 all have flat wall-facing sides 130. (The grooves being usable to hang the wall-mounts 120 on wall-screws or the like.) The sides 130 of the mounts 120 all reside within a single plane 122. It is notable that the wall-contact sides 130 of all three wall-mounts 120 reside in the same plane 122 regardless of whether the movable mount 117 (120) is located at location 148 as shown in FIG. 5A and FIG. 5B, or at location 144 as shown in FIG. 4 (and FIG. 6D below). The plane 122 corresponds to the surface of wall 115 in FIG. 4.

FIG. 6D illustrates another magnified view of a portion of the back pane 109 of the teleconferencing device 100 with the rear stand 112 detached. Removable wall-mount 117 (120) has been released from receiving area 142 and detachably connected to the back pane 109 at location 144. The other wall-mounts 118 (120) remain in place.

FIG. 7 illustrates a method 700 of presenting a teleconferencing device (100), comprising: providing 702 a teleconferencing device (100), wherein the teleconferencing device (100) comprises: a front side (103) having a first upper portion (104), a first lower portion (105), and one or more flat regions (106, 107) forming a first plane (108); and a back pane (109) having a second upper portion (110) connected to the first upper portion (104) and a second lower portion (111) connected to the first lower portion (105); and detachably connecting 704 a rear stand (112) to the back pane (109), whereby a hollow portion (132) of the rear stand (112) forms a housing around one or more wall-mount platforms (120) of the back pane (109), wherein each of the one or more wall-mount platforms (120) has a flat wall-contact portion (130) residing within a second plane (122).

Examples of this disclosure include the following:

1. A teleconferencing device (100), comprising: a front side (103), the front side (103) comprising a first upper portion (104), a first lower portion (105), and one or more planar regions (106, 107), at least one of the one or more planar regions (106, 107) residing within a first plane (108); a back pane (109) comprising a second upper portion (110) and a second lower portion (111), the second upper portion (110) connected to the first upper portion (104) and the second lower portion (111) connected to the first lower portion (105); a rear stand (112) detachably connected to the back pane (109), the rear stand (112) having a hollow portion (132) forming a housing around one or more wall-mount platforms (120), wherein each of the one or more wall-mount platforms (120) has a flat wall-contact portion (130), each flat wall-contact portion (130) residing within a second plane (122).

2. The teleconferencing device (100) of example 1, wherein at least one of the one or more wall-mount platforms (117, 120) is removably attached to the back pane (109).

3. The teleconferencing device (100) of example 2, wherein the back pane (109) comprises at least one wall-mount platform receiving area (142) configured to detachably receive at least one of the one or more removably attached wall-mount platforms (117, 120), whereby the flat wall-contact portion (130) of a detachably received wall-mount platform (117, 120) resides within the second plane (122).

4. The teleconferencing device (100) of example 2, wherein the rear stand (112) comprises a concave face on a first side and a convex face on a second opposing side, wherein the first side and the second opposing side meet at an opening detachably connecting the rear stand (112) to the back pane (109), and wherein the first side and second opposing side are joined at a base (113) distal from the first plane (108).

5. The teleconferencing device (100) of example 4, wherein the base (113) comprises at least one rectilinear portion configured to cause, when the second lower portion (111) and the base (113) are placed on a flat surface (102), the first plane (108) to form an angle of between twenty-nine and thirty-one degrees with the flat surface (102).

6. The teleconferencing device (100) of example 4, wherein the base (113) comprises at least one rectilinear portion configured to cause, when the second lower portion (111) and the base (113) are placed on a flat surface (102), the first plane (108) to form an angle of between forty-four and forty-six degrees with the flat surface (102).

7. The teleconferencing device (100) of example 4, wherein the base (113) comprises a rubber material.

8. The teleconferencing device (100) of example 4, wherein the base (113) comprises a flexibly rigid material integral with the rear stand (112).

9. The teleconferencing device (100) of example 4, wherein the rear stand (112) is removable by pressing a portion of the concave face towards a portion of the convex face.

10. The teleconferencing device (100) of example 4, wherein the opening detachably connecting the rear stand (112) to the back pane (109) forms a third plane, the third plane parallel with the first plane (108).

11. The teleconferencing device (100) of example 1, wherein the rear stand (112) is removable by translating some length of the rear stand (112) contacting the back pane (109) in a direction parallel to the first plane (108).

12. A teleconferencing device (100), comprising: a front face, the front face comprising a first upper portion (104), a first lower portion (105), and one or more planar areas (106, 107), the one or more planar areas (106, 107) residing within a first plane (108); and a back pane (109) having a second upper portion (110) and a second lower portion (111), the second upper portion (110) joined to the first upper portion (104) and the second lower portion (111) joined to the first lower portion (105), the back pane (109) comprising one or more wall-mount platforms (120), wherein the back pane (109) is configured to receive a detachable stand, the detachable stand having a hollow portion (132) capable of forming a housing around the one or more wall-mount platforms (120) when received.

13. The teleconferencing device (100) of example 12, wherein the back pane (109) is further configured to receive a detachable wall-mount platform (117, 120), alternately at a first location proximate at least one of the one or more wall-mount platforms (120), and at a different, second location.

14. The teleconferencing device (100) of example 13, wherein each wall-mount portion of the one or more wall-mount platforms (120) has a flat wall-contact portion (130), each flat wall-contact portion (130) residing within a second plane (122).

15. The teleconferencing device (100) of example 14, wherein the second plane (122) intersects the first plane (108) at an angle of thirty degrees.

16. The teleconferencing device (100) of example 14, wherein the detachable stand comprises a concave face on a first side and a convex face on a second opposing side, wherein the first side and the second opposing side meet at an opening, and wherein the first side and second opposing side are joined at a base (113) opposite from the opening.

17. The teleconferencing device (100) of example 16, wherein the back pane (109) is configured to receive the detachable stand in a first orientation whereby the detachable stand is operative to cause a thirty-degree angle to be formed between a flat surface (102) and the first plane (108) when the second lower portion (111) and the base (113) are in contact with the flat surface (102).

18. The teleconferencing device (100) of example 17, wherein the back pane (109) is configured to receive the detachable stand in a second orientation whereby the detachable stand is operative to cause a forty-five-degree angle to be formed between the flat surface (102) and the first plane (108) when the second lower portion (111) and the base (113) are placed on the flat surface (102).

19. A method of presenting a teleconferencing device (100), comprising: providing a teleconferencing device (100), the teleconferencing device (100) including: a front side (103) having a first upper portion (104), a first lower portion (105), and one or more flat regions forming a first plane (108); and a back pane (109) having a second upper portion (110) connected to the first upper portion (104) and a second lower portion (111) connected to the first lower portion (105); and detachably connecting a rear stand (112) to the back pane (109), whereby a hollow portion (132) of the rear stand (112) forms a housing around one or more wall-mount platforms (120) of the back pane (109), wherein each of the one or more wall-mount platforms (120) has a flat wall-contact portion (130) residing within a second plane (122), the second plane (122) forming an angle of between ten and twenty degrees with the first plane (108).

20. The method of example 19, further comprising: removing a removable wall-mount platform (117, 120) of the one or more wall-mount platforms (120) from a first location on the back pane (109); and removably attaching the removable wall-mount platform (117, 120) at a second location on the back pane (109), thereby causing the flat wall-contact portion (130) of the removable wall-mount platform (117, 120) to reside within the second plane (122).

The various examples within this disclosure are provided by way of illustration and should not be construed to limit the scope of the disclosure. Various modifications and changes can be made to the principles and examples described herein without departing from the scope of the disclosure and without departing from the claims which follow.

It is claimed:

1. A teleconferencing device, comprising:
   a front side, the front side comprising one or more planar regions, at least one of the one or more planar regions residing within a first plane;
   a back pane connected to the front side, the back pane comprising a lower portion; and
   a rear stand detachably connected to the back pane, the rear stand having a hollow portion forming a housing around one or more wall-mount platforms,
   wherein each of the one or more wall-mount platforms has a flat wall-contact portion, each flat wall-contact portion residing within a second plane.

2. The teleconferencing device of claim 1, wherein at least one of the one or more wall-mount platforms is removably attached to the back pane.

3. The teleconferencing device of claim 2, wherein the back pane comprises at least one wall-mount platform receiving area configured to detachably receive at least one of the one or more removably attached wall-mount platforms, whereby the flat wall-contact portion of a detachably received wall-mount platform resides within the second plane.

4. The teleconferencing device of claim 2, wherein the rear stand comprises a concave face on a first side and a convex face on a second opposing side, wherein the first side and the second opposing side meet at an opening detachably connecting the rear stand to the back pane, and wherein the first side and second opposing side are joined at a base distal from the first plane.

5. The teleconferencing device of claim 4, wherein the base comprises at least one rectilinear portion configured to cause, when the lower portion and the base are placed on a flat surface, the first plane to form an angle of between twenty-nine and thirty-one degrees with the flat surface.

6. The teleconferencing device of claim 4, wherein the base comprises at least one rectilinear portion configured to cause, when the lower portion and the base are placed on a flat surface, the first plane to form an angle of between forty-four and forty-six degrees with the flat surface.

7. The teleconferencing device of claim 4, wherein the base comprises a rubber material.

8. The teleconferencing device of claim 4, wherein the base comprises a flexibly rigid material integral with the rear stand.

9. The teleconferencing device of claim 4, wherein the rear stand is removable by pressing a portion of the concave face towards a portion of the convex face.

10. The teleconferencing device of claim 4, wherein the opening detachably connecting the rear stand to the back pane forms a third plane, the third plane parallel with the first plane.

11. The teleconferencing device of claim 1, wherein the rear stand is removable by translating some length of the rear stand contacting the back pane in a direction parallel to the first plane.

12. A teleconferencing device, comprising:
    a front face, the front face comprising one or more planar areas, the one or more planar areas residing within a first plane; and
    a back pane connected to the front face, the back pane having a lower portion and comprising one or more wall-mount platforms,
    wherein the back pane is configured to receive a detachable stand, the detachable stand having a hollow portion capable of forming a housing around the one or more wall-mount platforms when received.

13. The teleconferencing device of claim 12, wherein the back pane is further configured to receive a detachable wall-mount platform, alternately at a first location proximate at least one of the one or more wall-mount platforms, and at a different, second location.

14. The teleconferencing device of claim 13, wherein each wall-mount portion of the one or more wall-mount platforms has a flat wall-contact portion, each flat wall-contact portion residing within a second plane.

15. The teleconferencing device of claim 14, wherein the second plane intersects the first plane at an angle of thirty degrees.

16. The teleconferencing device of claim 14, wherein the detachable stand comprises a concave face on a first side and a convex face on a second opposing side, wherein the first side and the second opposing side meet at an opening, and wherein the first side and second opposing side are joined at a base opposite from the opening.

17. The teleconferencing device of claim 16, wherein the back pane is configured to receive the detachable stand in a first orientation whereby the detachable stand is operative to cause a thirty-degree angle to be formed between a flat surface and the first plane when the lower portion and the base are in contact with the flat surface.

18. The teleconferencing device of claim 17, wherein the back pane is configured to receive the detachable stand in a second orientation whereby the detachable stand is operative to cause a forty-five-degree angle to be formed between the flat surface and the first plane when the lower portion and the base are placed on the flat surface.

19. A method of presenting a teleconferencing device, comprising:

providing a teleconferencing device, the teleconferencing device including a front side having one or more flat regions forming a first plane and a back pane having a lower portion; and detachably connecting a rear stand to the back pane, whereby a hollow portion of the rear stand forms a housing around one or more wall-mount platforms of the back pane, wherein each of the one or more wall-mount platforms has a flat wall-contact portion residing within a second plane, the second plane forming an angle of between ten and twenty degrees with the first plane.

20. The method of claim 19, further comprising:

removing a removable wall-mount platform of the one or more wall-mount platforms from a first location on the back pane; and removably attaching the removable wall-mount platform at a second location on the back pane, thereby causing the flat wall-contact portion of the removable wall-mount platform to reside within the second plane.

\* \* \* \* \*